UNITED STATES PATENT OFFICE.

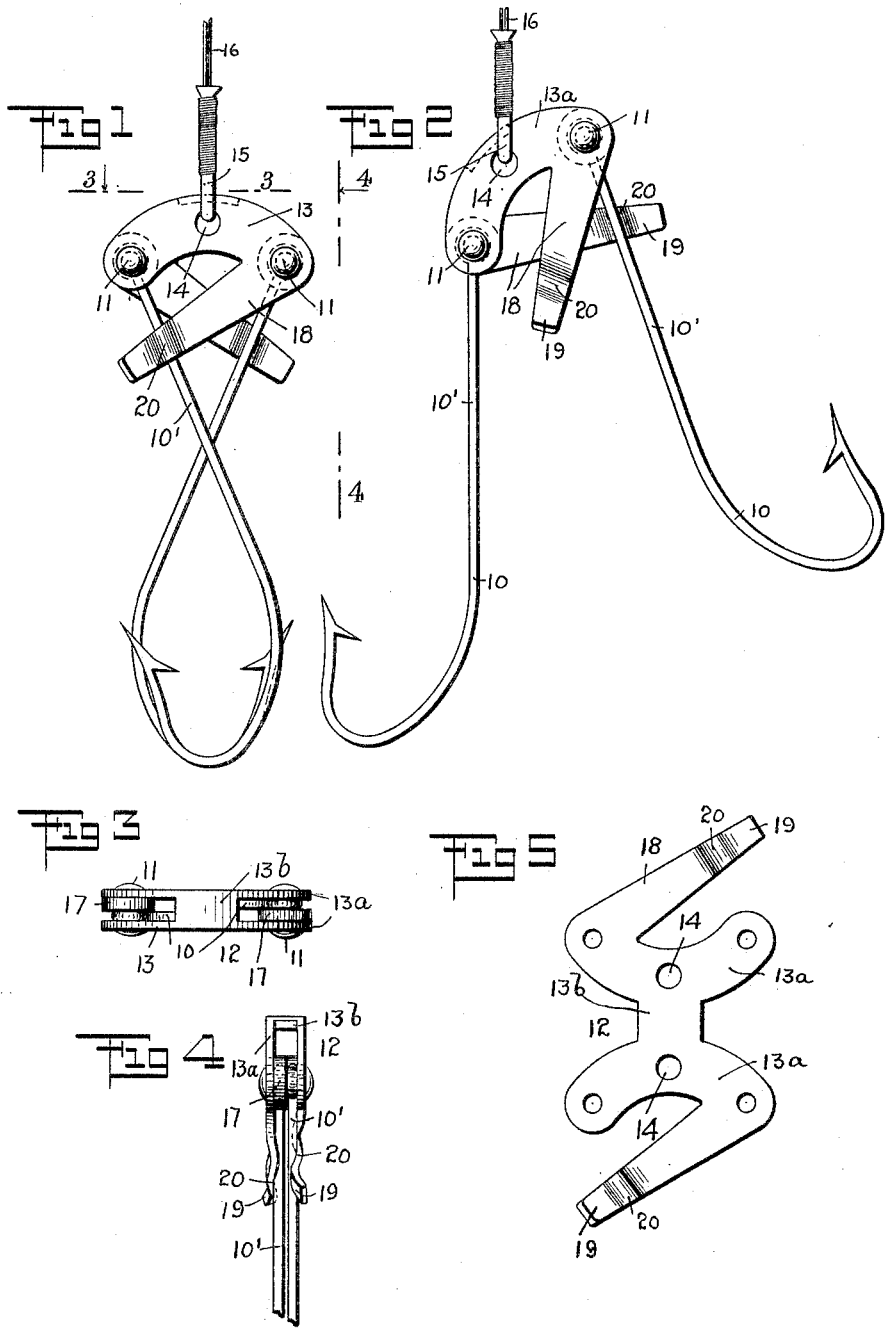

FREDERICK FOERSTER, OF ELIZABETH, NEW JERSEY.

AUTOMATIC FISH-HOOK.

1,081,106.  Specification of Letters Patent. Patented Dec. 9, 1913.

Application filed July 9, 1913. Serial No. 778,055.

*To all whom it may concern:*

Be it known that I, FREDERICK FOERSTER, a citizen of the United States, and a resident of Elizabeth, in the county of Union and State of New Jersey, have invented a new and Improved Automatic Fish-Hook, of which the following is a full, clear, and exact description.

This invention relates to fishing and trapping and has particular reference to fish hooks.

Among the objects of this invention is to improve the class of fish hooks so as to render them more reliable in practical operation.

More specifically stated, the invention contemplates the provision of a device having connected thereto pivotally a plurality of individual fish hooks, and also having means whereby when one of said hooks is struck by a fish, a pull upon the line will cause the other of said hooks to become operative or to increase its catching tendency.

The foregoing and other objects of the invention will hereinafter be more fully described and claimed and illustrated in the drawings forming a part of this specification in which like characters of reference indicate corresponding parts in all the views, and in which—

Figure 1 is a side view of a preferred form of this invention in its normal or set position; Fig. 2 is a similar view showing the hook in abnormal or sprung position; Fig. 3 is a plan view of the yoke as seen from the line 3—3 of Fig. 1; Fig. 4 is a side view of the same as seen from the line 4—4 of Fig. 1; and Fig. 5 is a plan view of the blank from which the yoke is constructed.

The several parts of this device may be made of any suitable materials and the relative sizes and proportions, as well as the general design thereof, may be varied to a considerable extent without departing from the spirit of the invention hereinafter more fully set forth and specifically claimed.

The device in its preferred form includes a pair of hooks 10 of any ordinary or approved form of construction, the same being pivotally connected at 11 to a sheet metal yoke 12. It may be observed at this time that the device is symmetrical with respect to its vertical axis, it being the same on each edge and both front and back.

The yoke 12 comprises a crown 13 consisting of two parallel plates 13ᵃ connected by a bridge 13ᵇ. Said plates are provided with alined holes 14 for the connection of the hanger 15 to which the line 16 is secured. Said plates are maintained in proper spaced relation by the pivots 11, and each pivot supports in addition to its hook 10 a spacer or washer 17.

Extending diagonally from one end of each plate 13ᵃ is a finger 18 having a spring trigger 19 at its end. Adjacent the trigger hook is provided a concavity 20 adapted to have seated therein a shank 10′ of the hook pivoted to the pivot at the opposite end of said plate. The finger 18 therefore lies substantially across or at right angles to said hook shank. The fingers 18 of both side plates extending as they do diagonally substantially intersect each other as viewed in front elevation, and hence the triggers thereof serve to maintain the hooks in substantially crossed relation but with the barbs of the hooks extending outwardly or slightly beyond the opposite bows or loops of the hooks.

The device in use may be briefly described as follows: With bait applied to either of the hooks 10, if a fish bites and strikes either of the barbs, it will cause a pull to be exerted upon the line 16 with the result that the yoke 12 will be swung around the pivot 11 of that particular hook, such movement of the yoke causing the opposite hook to be carried upwardly as indicated in Fig. 2. The latter mentioned hook will be caused to move, as indicated, by virtue of the spring trigger 19 having engagement with its shank. Such movement of the free hook will insure the engagement thereof with the fish's jaw, making it practically impossible for the fish to be lost from the hooks.

Having thus described my invention, I claim as new and desire to secure by Letters Patent:—

1. The herein described automatic fish hook comprising a yoke, a pair of fish hooks pivoted independently of each other to said yoke, and a pair of spring triggers extending diagonally from the opposite ends of said yoke and coöperating each with the shank of the opposite hook, maintaining the hook shanks in substantially crossed relation.

2. In a device of the character set forth, the combination of a yoke, a hanger pivotally connected intermediate the ends thereof, a pair of hooks pivotally connected independently of each other to the ends of the yoke and having their shanks in crossed relation in normal position, and a pair of spring fingers extending from the opposite ends of the yoke and interlocking with said hook shanks.

3. In a device of the character set forth, the combination of a yoke comprising a pair of spaced plates, a pair of pivots extending through the ends of the plates, and a pair of fish hooks pivoted independently of each other within said space on said pivots, each of said plates having an integral finger terminating in a spring trigger interlocking with the shank of the opposite fish hook, substantially as set forth.

In testimony whereof I have signed my name to this specification in the presence of two subscribing witnesses.

FREDERICK FOERSTER.

Witnesses:
   JAMES MULCAHY,
   JOHN CASTELINE.

Copies of this patent may be obtained for five cents each, by addressing the "Commissioner of Patents, Washington, D. C."